US011414955B2

(12) United States Patent
Liu et al.

(10) Patent No.: US 11,414,955 B2
(45) Date of Patent: Aug. 16, 2022

(54) VALVE STEM OF NEEDLE THROTTLE VALVE AND METHOD OF FABRICATING THE SAME

(71) Applicant: SHAREATE TOOLS LTD., Jiangsu (CN)

(72) Inventors: Pengfei Liu, Jiangsu (CN); Yongfeng Hu, Jiangsu (CN); Hehong Wu, Jiangsu (CN)

(73) Assignee: Shareate Tools Ltd., Jiangsu (CN)

( * ) Notice: Subject to any disclaimer, the term of this patent is extended or adjusted under 35 U.S.C. 154(b) by 289 days.

(21) Appl. No.: 16/577,641

(22) Filed: Sep. 20, 2019

(65) Prior Publication Data

US 2020/0165899 A1      May 28, 2020

(30) Foreign Application Priority Data

Nov. 23, 2018   (CN) .......................... 201811407826.4

(51) Int. Cl.
| | |
|---|---|
| *F16K 1/48* | (2006.01) |
| *B23P 15/00* | (2006.01) |
| *E21B 34/06* | (2006.01) |
| *F16K 3/02* | (2006.01) |
| *F16K 17/40* | (2006.01) |

(52) U.S. Cl.
CPC ............ *E21B 34/063* (2013.01); *B23P 15/00* (2013.01); *F16K 1/48* (2013.01); *F16K 3/0272* (2013.01); *F16K 17/406* (2013.01)

(58) Field of Classification Search
CPC .......... F16K 1/48; B23P 15/00; B23P 15/001; Y10T 29/49421; Y10T 29/49425; Y10T 29/4941
See application file for complete search history.

(56) References Cited

U.S. PATENT DOCUMENTS

| | | | | |
|---|---|---|---|---|
| 4,575,047 A | * | 3/1986 | Boos .......................... | F16K 1/38 251/356 |
| 4,659,245 A | * | 4/1987 | Hirao ....................... | F01D 5/025 403/272 |
| 4,723,863 A | * | 2/1988 | Takagi ...................... | B23K 1/18 228/132 |
| 4,747,722 A | * | 5/1988 | Kawaguchi ............ | C04B 37/026 403/30 |
| 4,778,345 A | * | 10/1988 | Ito ............................ | F01D 5/025 416/241 B |
| 4,942,999 A | * | 7/1990 | Oda ........................ | C04B 37/026 228/118 |
| 4,991,991 A | * | 2/1991 | Ito ........................... | C04B 37/005 403/272 |
| 5,028,162 A | * | 7/1991 | Tsuno .................... | C04B 37/026 403/30 |
| 5,104,747 A | * | 4/1992 | Makino .................. | C04B 35/645 403/29 |

(Continued)

*Primary Examiner* — Marina A Tietjen
(74) *Attorney, Agent, or Firm* — Frost Brown Todd LLC

(57) ABSTRACT

This disclosure provides a valve stem of a needle throttle valve and the method of fabricating the same. The valve stem includes ahead part, a body part, a washer, a first solder sheet and a second solder sheet. The washer is made of metal. The first solder sheet is placed between the head part and the washer, and the second solder sheet is placed between the body part and the washer. The head part, the washer and the body part are jointed together by the melted first solder sheet and the melted second solder sheet.

20 Claims, 2 Drawing Sheets

(56) References Cited

U.S. PATENT DOCUMENTS 5,178,362 A * 1/1993 Vogt ..................... B23K 26/28
228/262.41
9,429,244 B2 * 8/2016 Gao ..................... F16K 25/005

* cited by examiner

VALVE STEM OF NEEDLE THROTTLE VALVE AND METHOD OF FABRICATING THE SAME

CROSS-REFERENCE TO RELATED APPLICATION

The present application is based upon and claims the benefit of a priority of Chinese Patent Application No. 201811407826.4, filed on Nov. 23, 2018, the entire contents of which are incorporated herein by reference.

TECHNICAL FIELD

The disclosure relates to a valve stem, and particularly to a valve stem of a needle throttle valve in a drilling installation and a method of fabricating the same.

BACKGROUND

Needle throttle valves (hereinafter also referred as throttle valves) can be applied in for example kill manifolds for drilling wells to adjust pressure during fracturing drilling flowback system. Since the throttle valve is mainly surrounded by mud or fracturing fluid, the head of the valve stem (hereinafter also referred as head part) requires high wear resistance and high corrosion resistance. The valve stem suffers high frequency vibration in use, which may influence the life span and reliability of the throttle valve.

In prior art, a method of fabricating a valve stem includes: spraying coating of hard alloy on the head part, and connecting the head part and the body part by hot charging process or by connectors. The problems in prior art described above include: (i) due to the high frequency vibration during the usage of the valve stem, the sprayed coating of the hard alloy is easy to drop off, (ii) the head part with coating of the hard alloy is generally connected to the body part by manual welding, and since the joint face is large, it is not easy to fully weld the welding surface, and the welding reliability is low, and (iii) the connected parts connected by hot charging process or by connectors are not solid that the body part is easy to fall off, and the process is difficult to control and the production efficiency is low.

SUMMARY

This disclosure aims at overcoming or at least lightening at least one or some of the mentioned disadvantages and providing a valve stem of a needle throttle valve of high reliability and a method of fabricating the valve stem.

According to a first aspect of the disclosure there is provided a valve stem of a needle throttle valve, the valve stem including
a head part,
a body part,
a washer, which is made of metal,
a first solder sheet, placed between the head part and the washer, and
a second solder sheet, placed between the body part and the washer,
wherein the head part, the washer and the body part are jointed together by the melted first solder sheet and the melted second solder sheet.

According to a second aspect of the disclosure there is provided a method of fabricating a valve stem of a needle throttle valve, the valve stem including a head part, a body part, a metal made washer, a first solder sheet and a second solder sheet, wherein the method comprises
placing the second solder sheet between the body part and the washer,
placing the first solder sheet between the head part and the washer, and
heating the valve stem by a medium frequency heater to melt the first solder sheet and the second solder sheet to joint the head part, the washer and the body part together.

DETAILED DESCRIPTION

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

Figure 2:
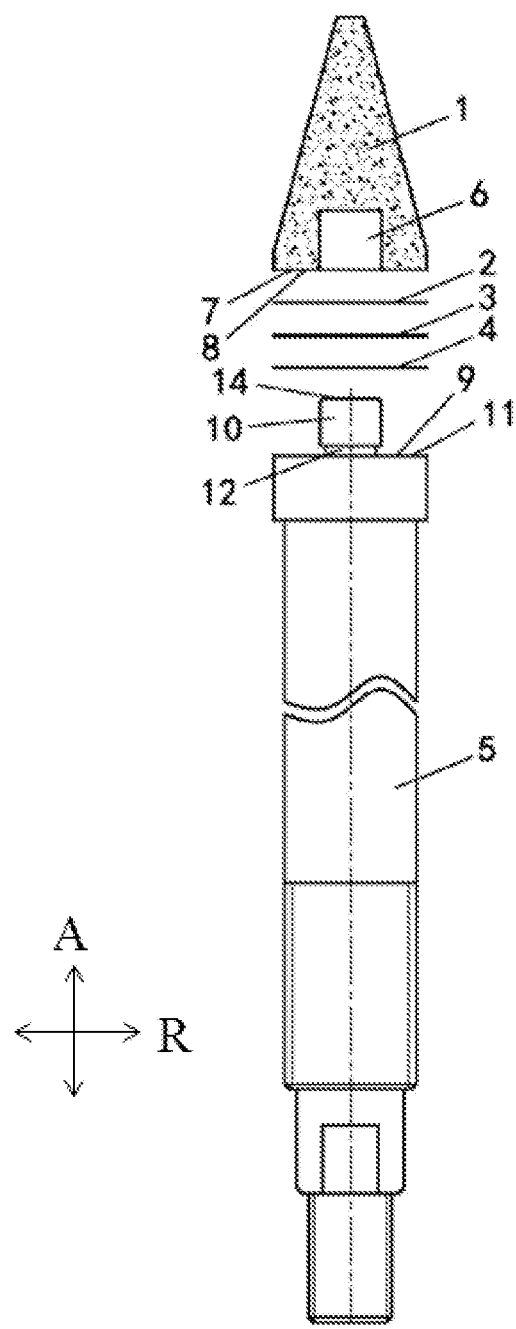
FIG. 2 is an exploded view of FIG. 1.

Unless defined otherwise, referring to FIG. 2, arrow A indicates an axial direction of a throttle valve, and arrow R indicates a radial direction of the throttle valve, and the direction pointing from a body part 5 to a head part 1 indicates the front direction while the opposite direction thereof indicates the rear direction.

Figure 1:
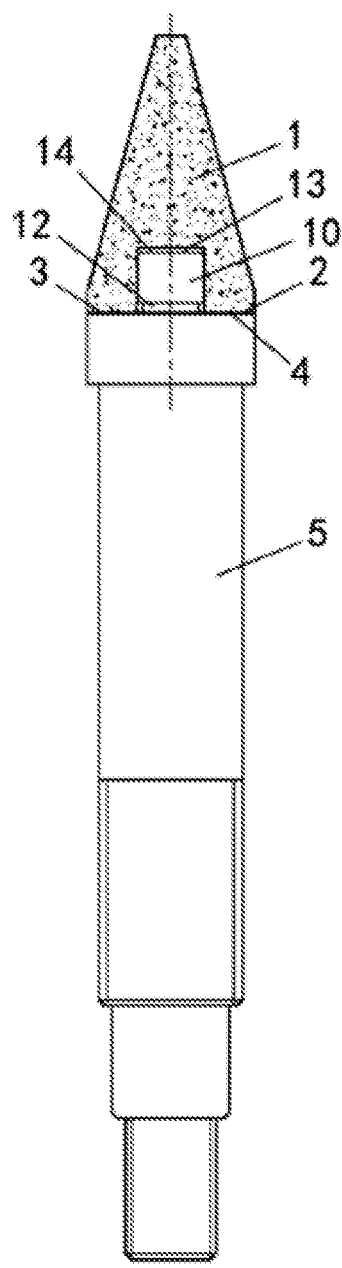
FIG. 1 shows a structure of a valve stem according to an embodiment of the disclosure.

FIG. 1 and FIG. 2 show a structure of the throttle valve.

The throttle valve of this embodiment includes a tapered head part 1, a first solder sheet 2, a washer 3, a second solder sheet 4 and a cylindrical body part 5 in sequence in the axial direction A. The material of the first solder sheet 2 and the second solder sheet 4 may be the same.

The head part 1 has a rear face 7, and an assembly recess 6 is concavely formed on the rear face 7. The assembly recess 6 locates in the geometrical center of the rear face 7. The remainder of the rear face 7 other than the assembly recess 6 forms a first welding face 8, which is annular. The width or diameter of the assembly recess 6 is ¼ to ⅓ of the outer diameter of the first welding face 8. Preferably, the head part 1 is manufactured of materials comprising hard alloy. More preferably, the head part 1 is manufactured of hard alloy.

The body part 5 has a front face 9, and an assembly head 10 is convexly formed on the front face 9. The assembly head 10 locates in the geometrical center of the front face 9, aligning to the assembly recess 6. The remainder of the front face 9 other than the assembly head 10 forms a second welding face 11, which is annular. Preferably, the shape of the second welding face 11 is the same as the first welding face 8.

The root portion (also referred as the rear end) of the assembly head 10 recesses towards a radially inner side and forms an annular groove 12. With the aforementioned structure, the head part 1 and the body part 5 fit tightly with high coaxiality when they assembled to each other.

The assembly head 10 is in clearance fit with the assembly recess 6. The gap 13 between the assembly head 10 and the assembly recess 6 includes gaps both in the radial direction R and in the axial direction A. The size of the gap 13 is larger than a deformation due to thermal expansion of the body part 5 in a process of welding. Preferably, the radial gap between the assembly head 10 and the assembly recess 6 satisfies: after they deforming due to thermal expansion during welding process, there is still a 0.05 mm to 0.1 mm of radial gap between the assembly head 10 and the assembly recess 6. The method of fabricating the valve stem of the throttle valve which will be described in more detail below includes: the valve stem will be placed axially erected in an medium frequency heater, so that the radial gap ensures the head part 1 adjust its position by gravity to fit tightly with the body part 5 when solder melts, which contributes to a coaxial positioning of the head part 1 and the body part 5 during welding.

The first solder sheet 2, the washer 3, and the second solder sheet 4 each are annular shaped. The shape of the three parts matches (is the same or similar to) the shape of the first welding face 8 and the second welding face 11 for an easy attachment during welding.

The flatness of an axial face 14 of the assembly head 10 which faces the head part 1 is less than 0.05 mm, and the flatness of the first welding face 8 is less than 0.05 mm, which contributes to a good effect of welding. Preferably, the material of the first solder sheet 2 and the second solder sheet 4 are the same, which improves the welding performance, in case solder sheets of different materials with different densities melt and flow to cause an uneven distribution of the solder at a welding portion. Preferably, the first solder sheet 2 and the second solder sheet 4 both contain copper or both contain silver.

The washer 3 helps relieving stress concentration of the jointed head part 1 and body part 5, and avoiding cracks from occurring in the head part 1 or the body part 5. The washer 3 also functions as a buffer layer to relieve shocks and vibrations in the usage of the valve stem so as to enhance the structural strength and life span of the valve stem Preferably, the thickness of the washer 3 is 0.15 mm to 0.3 mm.

First Embodiment of Washer 3

In the first embodiment, the washer 3 is a copper sheet without perforations. The head part 1 is made of hard alloy, and the body part 5 is made of stainless steel.

The first solder sheet 2 and the second solder sheet 4 sandwich the washer 3 in the axial direction A. When the first solder sheet 2 and the second solder sheet 4 melt during the medium frequency localized heating process which will be described in more detail below, the first solder sheet 2 will connect the head part 1 and one side of the washer 3 by capillarity, and the second solder sheet 4 will connect the body part 5 and the other side of the washer 3 by capillarity. Through this process, the first solder sheet 2, the washer 3 and the second solder sheet 4 can joint together firmly.

Since the shrinkage of copper is different from that of the hard alloy of the head part 1 and that of the stainless steel of the body part 5, the washer 3 can relieve the stress concentration of the head part 1 and the body part 5 during the welding process.

Second Embodiment of Washer 3

In the second embodiment, the washer 3 is a metal mesh screen, which means the washer 3 has holes penetrating in the axial direction A. Preferably, the mesh screen has a mesh number between 60 and 100.

For example, the washer 3 may be made of stainless steel. The holes provide room for the flowing of the solder, so as to avoid the melting solder flowing to unexpected areas and avoid the loss of the solder. Meanwhile, the washer 3 made of metal can relieve the stress concentration of the head part 1 and the body part 5 to some extent.

For another example, the washer 3 may be made of or contain copper. Such a washer 3 can not only relieve the stress concentration of the head part 1 and the body part 5 as the washer 3 in the first embodiment, but also prevent the loss of the solder by its holes.

Third Embodiment of Washer 3

In the third embodiment, the washer 3 has a multi-layer structure.

For example, the washer 3 includes two layers. The first layer is a copper sheet without perforations, and the second layer is a metal mesh screen.

For another example, the washer 3 includes three layers. The middle layer is a copper sheet without perforations, and the other two layers at both sides of the middle layer are metal mesh screens.

The layer of copper sheet can relieve the stress concentration of the head part 1 and the body part 5, while the layer of metal mesh screen can prevent the loss of the solder.

The method of fabricating the valve stem of the throttle valve is introduced in the following.

Step one: providing the body part 5.

Form the assembly head 10 at a front part of the body part 5, and form the annular groove 12 at the root portion of the assembly head 10.

Step two: providing the head part 1.

Form the assembly recess 6 at the rear face 7 of the head part 1. The assembly recess 6 is configured to be in clearance fit with the assembly head 10. Preferably, the radial gap satisfies: after the assembly head 10 and the assembly recess 6 deformed due to thermal expansion during welding process, there is still a 0.05 mm to 0.1 mm of radial gap between the assembly head 10 and the assembly recess 6.

The head part 1 has a cobalt content of 10% to 16% by weight.

Step three: shaping the solder sheets and the washer 3.

Shape the first solder sheet 2, the washer 3, and the second solder sheet 4 by means of molds. Shapes of the three parts are each annular and match the shapes of the first welding face 8 and the second welding face 11.

The thickness of the washer 3 is 0.15 mm to 0.3 mm. The tensile strength of the washer 3 is larger than 485 Mpa. The yield strength of the washer 3 is larger than or equals to 170 Mpa.

Step four: sand blasting.

Sand blast is performed to the first welding face 8 and the second welding face 11 respectively. After sand blasting, wash the first welding face 8 and the second welding face 11 with alcohol. The mesh number of the grit is larger than 30.

The aim of sand blasting is to remove the stains which may influence the process of welding. The requirement of sand blasting can be achieved by the grit with the mesh number larger than 30 is that: in any area of 25×25 $mm^2$, the total proportion where color changed owing to the residual rust, greasy dirt, oxide scale and other dirt is no more than 3%.

Step five: loading before welding.

Place the body part 5 vertically with the assembly head 10 upwards. Place the second solder sheet 4, the washer 3, the first solder sheet 2 and the head part 1 successively on the second welding face 11. Apply soldering flux between the base metal and the solder sheet, or in other words, apply soldering flux on both sides of the first solder sheet 2 and the second solder sheet 4.

The selected soldering flux can match the material of the first solder sheet 2 and the second solder sheet 4. For example, apply copper soldering flux for a copper solder sheet or apply silver soldering flux for a silver solder sheet. The soldering flux helps to remove oxides occurred during high temperature heating.

Step six: welding by medium frequency induction

Place the body part 5 in a medium frequency heater (not shown in figures). The heating area covers the first welding face 8 and the second welding face 11 in the radial direction A.

The medium frequency heater comprises a medium frequency inductor. There is a 7 mm to 12 mm of gap between the medium frequency inductor and the body part 5.

The frequency of the medium frequency heater may be 500 Hz to 20 KHz.

Step seven: starting the medium frequency heater.

Set the running time for the medium frequency heater as 2 min to 3 min. Heat the body part 5 under a heating rate less than or equals to 10° C./s until the first solder sheet 2 and the second solder sheet 4 get melted completely. The highest welding temperature is less than or equals to a set target temperature.

The principle of the medium frequency heater is to produce high density magnetic lines from the medium frequency induction by connecting it to medium frequency alternating current power. The magnetic lines can generate induced current in metal objects, so as to heat the first welding face 8 and the second welding face 11 rapidly.

Step eight: heat preservation after welding.

Subject the valve stem to an artificial aging treatment, which includes: inserting the valve stem into dense pearlite powder or other insulating materials of similar effect to conduct a heat preservation for a retention time of more than or equals to 8 h.

The steps described above are for illustration purposes only to show the method of fabricating the valve stem of the throttle valve, but not for emphasizing or limiting performing orders. The order of operations in one step can be adjusted properly. The above steps can be conducted in other proper orders, especially the order from step one to step five can be changed properly.

Preferably, the first solder sheet 2 and the second solder sheet 4 are both copper solder sheets, the material of which may comprise compositions with their parts by weight as follows:

Cu 45 to 65 parts by weight;
Zn 30 to 45 parts by weight;
Mn 2 to 7 parts by weight;
Sn 1 to 7 parts by weight;
Ni 1 to 7 parts by weight.

In this embodiment, the target temperature in step seven may range from 800° C. to 850° C.

In another embodiment, the first solder sheet 2 and the second solder sheet 4 are both silver solder sheets, the material of which may comprise compositions with their parts by weight as follows:

Ag 15 to 50 parts by weight;
Cu 20 to 45 parts by weight;
Zn 15 to 35 parts by weight.

In this embodiment, the target temperature in step seven may range from 600° C. to 650° C.

This disclosure has at least one of the following advantages:

(i) The washer 3 is placed between the head part 1 and the body part 5, which can relieve the stress concentration of the head part 1 and the body part 5 when they being connected. For the embodiments in which the washer 3 has meshes, the meshes can help preventing the loss of solder, so as to make the welding stronger.

(ii) Solder sheets (the first solder sheet 2 and the second solder sheet 4) are placed at both axial sides of the washer 3. When the solder sheets get melted, the washer 3 gets connected to the head part 1 and the body part 5 at the two axial sides respectively by capillarity. Moreover, the two solder sheets connect the head part 1 and the body part 5 at the axial direction A, which gives the valve stem a stronger tensile strength so that the valve stem can adapt its operating condition better.

(iii) In this disclosure, the welding process is achieved by localized heating, which is of high efficiency, easy operation and low cost.

(iv) The washer 3 can also resist shocks and vibrations during the valve's usage, which helps to enhance the structure strength of the valve stem and extend the life span of the valve stem.

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. A valve stem of a needle throttle valve, comprising
a head part,
a body part,
a washer, which is made of metal,
a first solder sheet, placed between the head part and the washer and melted, and
a second solder sheet, placed between the body part and the washer and melted,
wherein the head part, the washer and the body part are jointed together by the first solder sheet and the second solder sheet.

2. The valve stem of claim 1, wherein the material of the washer comprises copper.

3. The valve stem of claim 1, wherein the washer comprises a mesh screen layer, the mesh screen layer having holes penetrating in an axial direction of the valve stem.

4. The valve stem of claim 3, wherein the mesh screen layer has a mesh number between 60 and 100, and the thickness of the mesh screen layer is 0.15 mm to 0.3 mm.

5. The valve stem of claim 3, wherein the washer also comprises a copper sheet layer, and the copper sheet layer being connected to the mesh screen layer axially.

6. The valve stem of claim 5, wherein the washer comprises two mesh screen layers and the copper sheet layer connects to a mesh screen layer at both axial sides respectively.

7. The valve stem of claim 1, wherein a rear face of the head part facing the body part dents away from the body part to form an assembly recess, and
a front face of the body part facing the head part protrudes towards the head part to form an assembly head, the assembly head inserting to the assembly recess, and the assembly head being in clearance fit with the assembly recess before welding.

8. The valve stem of claim 7, wherein the width or diameter of the assembly recess is ¼ to ⅓ of the outer diameter of the rear face of the assembly head.

9. The valve stem of claim 7, wherein the flatness of an end face of the assembly head is less than 0.05 mm, and the flatness of the rear face of the head part is less than 0.05 mm.

10. The valve stem of claim 7, wherein the root portion of the assembly head which adjoins the front face recesses towards a radial inner side and forms an annular groove.

11. The valve stem of claim 7, wherein the washer, the first solder sheet and the second solder sheet each has an annular shape, and the assembly head inserts in the central hole of the annular shape.

12. The valve stem of claim 1, wherein the material of the head part comprises cemented carbide, and the material of the body part comprises stainless steel, and the first solder sheet and the second solder sheet are both copper solder sheets or are both silver solder sheets.

13. A method of fabricating a valve stem of a needle throttle valve, the valve stem comprising a head part, a body part, a metal made washer, a first solder sheet and a second solder sheet, wherein the method comprises: placing the second solder sheet between the body part and the washer; placing the first solder sheet between the head part and the washer; and heating the valve stem by a medium frequency heater to melt the first solder sheet and the second solder sheet to joint the head part, the washer and the body part together.

14. The method of claim 13, wherein the heating area of the medium frequency heater covers the region of the body part where the first solder sheet and the second solder sheet locate.

15. The method of claim 13 comprising: assembling the head part, the first solder sheet, the washer, the second solder sheet and the body part together to form an assembly part; and placing the assembly part inside the medium frequency heater vertically with the body part downwards and the head part upwards and then heating the assembly part.

16. The method of claim 13, wherein a running time of the medium frequency heater ranges from 2 min to 3 min, with a heating temperature less than or equal to a target temperature and a heating rate of the body part less than or equal to 10° C./s.

17. The method of claim 16, wherein the first solder sheet and the second solder sheet are both copper solder sheets, which comprise compositions with the following parts by weight:
Cu 45 to 65 parts,
Zn 30 to 45 parts,
Mn 2 to 7 parts,
Sn 1 to 7 parts,
Ni 1 to 7 parts,
and the target temperature ranges from 800° C. to 850° C.

18. The method of claim 16, wherein the first solder sheet and the second solder sheet are both silver solder sheets, which comprise compositions with the following parts by weight:
Ag 15 to 50 parts,
Cu 20 to 45 parts,
Zn 15 to 35 parts,
and the target temperature ranges from 600° C. to 650° C.

19. The method of claim 13, wherein the frequency of the medium frequency heater is 500 Hz to 20 KHz, and the medium frequency heater comprises a medium frequency inductor, a gap between the medium frequency inductor and the body part is 7 mm to 12 mm.

20. The method of claim 13 comprising heat preservation after welding, which comprises: subjecting the valve stem to an artificial aging treatment after the heating process, and a retention time of the artificial aging treatment is more than or equals to 8 h.

* * * * *